July 9, 1957 R. E. GARRISON 2,798,332
ANTI-SNAG SINKER
Filed March 16, 1956

INVENTOR.
RALPH E. GARRISON,
BY
McMorrow, Berman & Davidson
ATTORNEYS.

United States Patent Office 2,798,332
Patented July 9, 1957

2,798,332

ANTI-SNAG SINKER

Ralph E. Garrison, Blackwell, Okla.

Application March 16, 1956, Serial No. 572,145

3 Claims. (Cl. 43—44.97)

The present invention, summarized briefly, is a fishing sinker comprising an elongated body, longitudinally spaced line-attaching eyes on the top thereof, and a pair of forwardly projecting, diverging prongs providing obstruction-engaging means on which the sinker and hook may rock or swing over the obstruction.

Important objects are:

To incorporate in a sinker means to prevent snagging of the sinker and hook upon an underwater obstruction;

To accomplish this with a sinker capable of manufacture at very low cost;

To facilitate the connection of the sinker to the line or leader, as well as its ready disconnection; and To provide an improved form and weighting of the sinker body.

Other objects will appear from the following description, the claims appended thereto, and from the annexed drawing, in which like reference characters designate like parts throughout the several views, and wherein:

Figure 1:
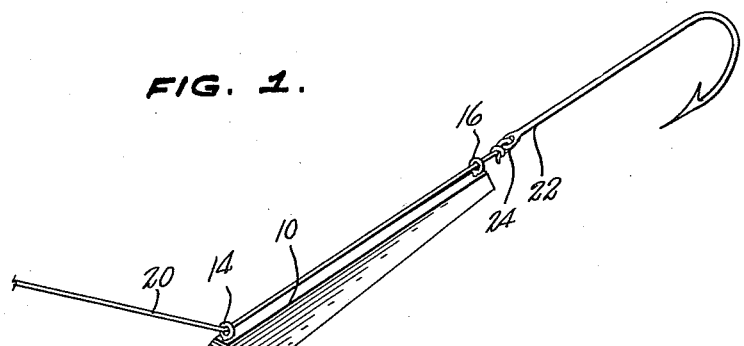
Figure 1 is a perspective view of the sinker.
Figure 2:
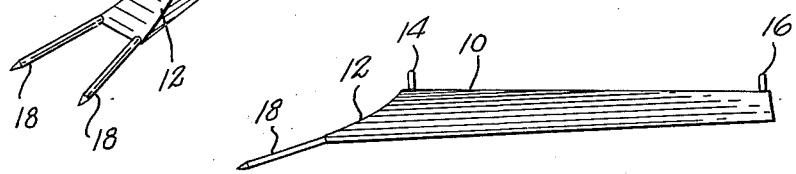
Figure 2 is a side elevation.
Figure 3:
Figure 3 is a top plan view.

The sinker includes an elongated body 10 the top surface of which is slightly oblique to the bottom surface to taper the body toward the rear extremity thereof. The front face 12 of the body is inclined rearwardly, upwardly from the leading end of the bottom surface and is concaved.

To the top surface there are secured eyes 14, 16 providing line guides, these being disposed one at the front end and one at the rear end of the body.

A pair of straight, pointed prongs 16 are secured to body 10 in substantially the plane of the bottom surface and diverge in a direction forwardly from the body.

Designated at 20 is a line which may be a short leader. This extends through guides 14, 16 and connected to the line a short distance rearwardly from guide 16 is a hook 22.

Figure 4:
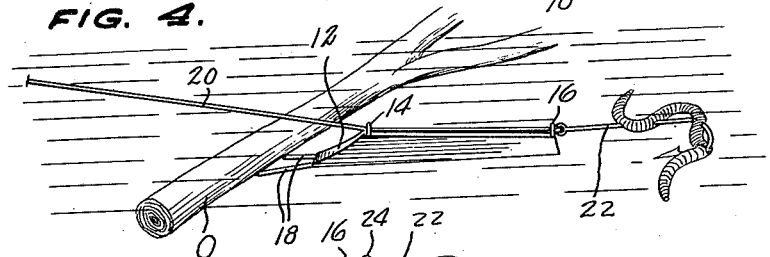
Figure 4 is a perspective view on a reduced scale of the sinker in use.
Figure 5:
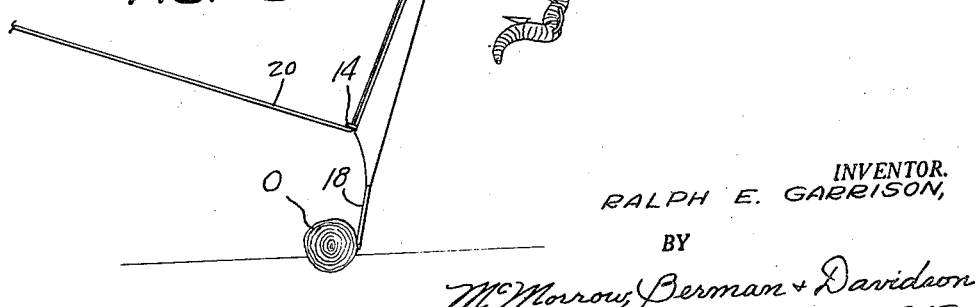
Figure 5 is a side elevation of the sinker, on a reduced scale, showing it rocking over the obstruction.

In use, the weighting of the sinker causes it to depend from line 20 with its center of gravity located near the front end of the body. The sinker tips downwardly at its front end as the line is drawn through the water. When an obstruction O is encountered, prongs 18 engage the same (Figure 4). Continued pull on the line causes the sinker to rock upon the obstruction upwardly and over the same, carrying with it the hook. The prongs disengage as the sinker swings over the obstruction. The rocking is caused, it should be noted, by pull on the guide 14, located well rearwardly from the prongs, and this creates the swinging movement.

Should one prong engage the obstruction before the other, the location of the line of pull between the prongs will cause lateral swinging of the body to engage both prongs with the obstruction, after which the body will swing upwardly as previously described.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A sinker comprising an elongated body having top and bottom longitudinal surfaces and formed with a beveled front end surface lying substantially in a plane at an acute angle to the bottom surface and at an obtuse angle to the top surface; line-receiving eyes on the top surface aligned longitudinally of the body, one at the juncture of the front end surface and the top surface and the other at the rear end of the body; and a pair of prongs projecting forwardly from the body at the juncture of the front end surface and bottom surface to engage an obstruction in the path of the body and form a fulcrum on which the body may rock upwardly and over the obstruction, responsive to a pull on the line transmitted to the body at the location of said one eye.

2. A sinker comprising an elongated body having top and bottom longitudinal surfaces and formed with a beveled front end surface lying substantially in a plane at an acute angle to the bottom surface and at an obtuse angle to the top surface; line-receiving eyes on the top surface aligned longitudinally of the body, one at the juncture of the front end surface and the top surface and the other at the rear end of the body; and a pair of prongs projecting forwardly from the body at the juncture of the front end surface and bottom surface to engage an obstruction in the path of the body and form a fulcrum on which the body may rock upwardly and over the obstruction, responsive to a pull on the line transmitted to the body at the location of said one eye, said prongs lying in a plane substantially common to said first named plane to define a forward extension of said end surface.

3. A sinker comprising an elongated body having top and bottom longitudinal surfaces and formed with a beveled front end surface lying substantially in a plane at an acute angle to the bottom surface and at an obtuse angle to the top surface; line-receiving eyes on the top surface aligned longitudinally of the body, one at the juncture of the front end surface and the top surface and the other at the rear end of the body; and a pair of prongs projecting forwardly from the body at the juncture of the front end surface and bottom surface to engage an obstruction in the path of the body and form a fulcrum on which the body may rock upwardly and over the obstruction, responsive to a pull on the line transmitted to the body at the location of said one eye, said prongs lying in a plane substantially common to said first named plane to define a forward extension of said end surface, said one eye being disposed substantially in said first named plane.

References Cited in the file of this patent

UNITED STATES PATENTS

| D. 57,739 | Stolley | Apr. 26, 1921 |
| 1,322,706 | Loegman | Nov. 25, 1919 |
| 1,778,119 | Neville | Oct. 14, 1930 |